United States Patent
Ries et al.

[11] Patent Number: 5,153,823
[45] Date of Patent: Oct. 6, 1992

[54] DEVICE TO MEASURE AND/OR CONTROL FLOW-THROUGH AND/OR QUANTITY OF HEAT

[75] Inventors: Peter Ries, Reinach; Paul Nauer, Steinhausen; Wolfgang Huber, Cham, all of Switzerland

[73] Assignee: Landis & Gyr Betriebs AG, Zug, Switzerland

[21] Appl. No.: 497,089

[22] Filed: Mar. 21, 1990

[30] Foreign Application Priority Data

Apr. 3, 1989 [CH] Switzerland .................. 1214/89
Mar. 8, 1990 [CH] Switzerland .................. 745/90

[51] Int. Cl.⁵ .................. G05B 11/32; G01F 1/22; G01K 17/06
[52] U.S. Cl. .................. 364/172; 73/861.53; 364/510; 364/557; 364/558; 374/41; 374/143
[58] Field of Search .................. 364/172, 510, 509, 557, 364/558, 556; 73/861.53–861.58, 861.42, 861.44, 861.62; 374/39–41, 141–143, 135, 138, 112, 113, 114

[56] References Cited

U.S. PATENT DOCUMENTS 4,643,213 2/1987 Mirel ............... 73/861.58 X
4,728,869 3/1988 Johnson et al. ............ 318/599
4,813,339 3/1987 Uno et al. .................. 318/645

FOREIGN PATENT DOCUMENTS 0047783 4/1977 Japan .................. 374/41

Primary Examiner—Joseph Ruggiero
Attorney, Agent, or Firm—Marmorek, Guttman & Rubenstein

[57] ABSTRACT

A device for measuring or controlling a property of a flow medium comprises a conduit which carries a flow medium. A choke element located in the conduit has a first open operating position and a second closed operating position. A driver drives the choke element from one operating position to the other. A pressure sensor measures the difference in pressure before and after the choke element in said conduit. A processor responsive to the pressure difference calculates a flow or thermal property of the flow medium. The processor comprises an input for receiving a continuous control signal which indicates a desired value of a flow or thermal property of the flow medium and a converter for converting the continuous control signal into a pulse-pause signal for controlling the driver.

12 Claims, 3 Drawing Sheets

5,153,823

DEVICE TO MEASURE AND/OR CONTROL FLOW-THROUGH AND/OR QUANTITY OF HEAT

FIELD OF THE INVENTION

The instant invention relates to a device to measure and/or control the flow and/or quantity of heat of a flow medium in a conduit.

BACKGROUND OF THE INVENTION

A device to measure and to control flow and quantity of heat is known from DE-OS 33 12 140. To measure quantity of heat, the difference of the initial and return temperature of a heat circuit as well as the opening in time of an OPEN/CLOSED valve as well as the calibration value for the flow are multiplied with each other. Instead of the calibration value of the flow it is also possible to find the pressure difference through the valve. The valve is controlled by means of a volume temperature sensor, A quantity-regulating valve where the pressure and the temperature are measured before and after the valve and the opening cross-section of the valve is measured and further processed by a computer is known from DE-OS 37 00 898.

Furthermore a quantity regulating valve where means for the measurement of the differential pressure through the valve are installed within a housing is known from EP-OS 0 309 643.

Even if the actual pressure difference is measured there remains the problem that intolerable measuring errors occur when flow and/or temperature differences are very small. The occurring problems are pointed out in the DE-Z (German periodical) "Fernwärme international" 17(1988), vol. 1, pages 23–35. It is known that extremely small flow and/or temperature differences which are beyond the measuring range of the measuring means occur especially during transitional periods.

The instant invention has as its object to create a device to measure and to control flow and/or heat quantities of a flow medium in a conduit at low manufacturing cost capable of sufficiently and precisely measuring and controlling flow and/or heat quantities even when the flow and/or temperature differences are very small.

SUMMARY OF THE INVENTION

In accordance with an illustrative embodiment of the present invention, a device for measuring or controlling a flow or thermal property comprises a conduit which carries a flow medium. A choke element located in the conduit has a first open operating position and a second closed operating position. A driver drives the choke element from one operating position to the other. A pressure sensor measures the difference in pressure before and after the choke element in the conduit. A processor responsive to the pressure difference calculates a flow or thermal property of the flow medium. The processor comprises means for receiving a continuous control signal which indicates a desired value of said flow or thermal property and converting means for converting the continuous control signal into a pulse-pause signal for controlling the drive.

DETAILED DESCRIPTION OF THE INVENTION

Figure 1:
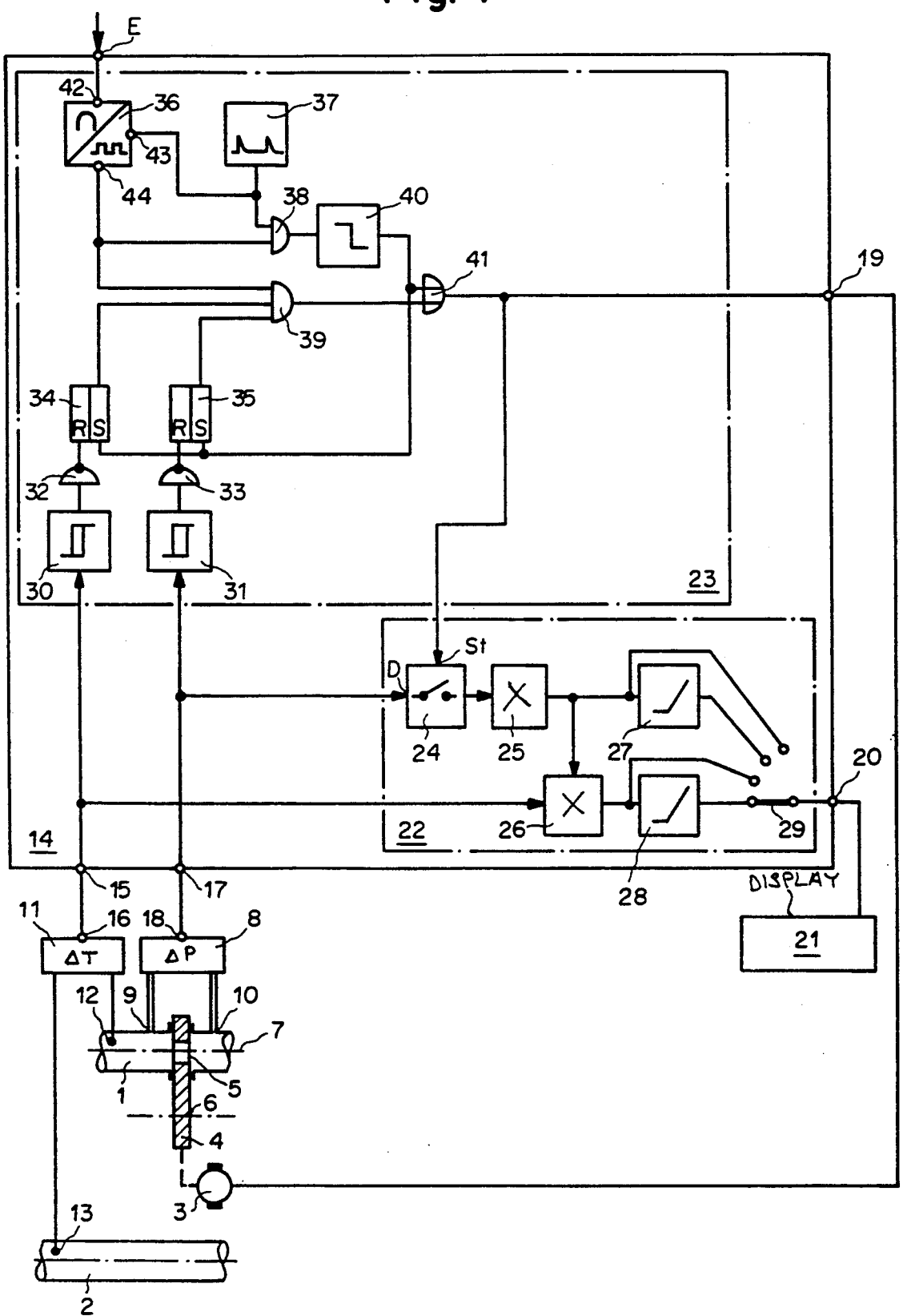
FIG. 1 shows a block diagram of a device with a two-phase choke element in accordance with an illustrative embodiment of the present invention.

In FIG. 1, the reference 1 designates an initial conduit for a flow medium of a heat circuit and 2 designates a return conduit of a heat circuit. A choke element 4 driven by a drive 3 is built into the initial conduit 1. This choke element 4 is provided with an opening 5 which takes effect in the drawn position, hereinafter designated as position I. The choke element 4 is here open and allows flow-through. The choke element 4 has a second position in which the axis 6 is aligned with the central axis 7 of the conduit 1. In this second position, the choke element 4 is closed and flow is thus interrupted. This position shall hereinafter be designated position O.

Reference numeral 8 designates a differential pressure sensor which is connected via a first opening 9 to the space before the choke element 4 and via a second opening 10 to the space after the choke element 4.

Reference 11 designates a temperature difference sensing element which measures the temperature of the medium in the conduit 1 at a first measuring point 12 and in the return conduit 2 at a second measuring point 13 and which calculates from this the temperature difference between initial conduit I and return conduit 2.

Reference 14 designates a computer which has an input E which receives a continuous control signal. The computer 14 is provided with a second input 15 which is connected to an output 16 of the temperature difference measuring element 11 and is provided with a third input 17 which is connected to an output 18 of the differential pressure sensor 8. The computer 14 is furthermore provided with a first output 19 which is connected to the drive 3 and with a second output 20 to which a display 21 is connected.

The internal structure of the computer 14 shall be described below. This description pertains to an analog computer. A digital computer can be used just as well. Its functions can also be derived without difficulty from the description of the analog computer. With a digital computer, analog-digital converters or digital-analog converters are provided at the inputs and outputs.

The computer 14 comprises a functional block 22 serving essentially to calculate flow and quantity of heat values and of a control block 23 serving mainly to control the choke element 4.

The functional block 22 comprises an analog switch 24, a first multiplier 25, a second multiplier 26, a first integrator 27, a second integrator 28 and a switch 29.

The control block 23 comprises a first threshold value switch 30, a second threshold value switch 31, a first invertor 32, a second invertor 33, a first flipflop 34, a second flipflop 35, a converter 36, a clock generator 37, a two input AND-gate 38, a three input AND-gate 39, a delay element 40 providing a fall-delay time for extending a HIGH signal, and an OR-gate 41.

A connection goes from the input 15 of the computer 14 to an input of the threshold switch 30 and to an input of the multiplier 26. The input 17 of the computer 14 is connected to the input of the threshold switch 31 and to a data input D of the analog switch 24, the control input St of which is provided with a connection to the output of the OR-gate 41. The output of the analog switch 24 acts upon the input of the multiplier 25, the output of which leads to the second input of the multiplier 26, to the input of the integrator 27, and furthermore to a first contact of the switch 29. The output of the integrator 27 is connected to a second contact of the switch 29. In the same manner a connection exists between the output of the multiplier 26 and a third contact of the switch 29 as well as to the input of the integrator 28. The output of the integrator 28 is connected to a fourth contact of the switch 29. The middle contact of the switch 29 leads to the output 20.

Within the control block 23 the output of the threshold switch 30 is connected via invertor 32 to the reset input R of the flipflop 34 and in an analogous manner the output of the threshold switch 31 is connected via invertor 33 to the reset input R of the flipflop 35.

The threshold value switch 31 switches as follows:

Its output has a LOW signal when the differential pressure is below $p_{Uoff}$. As the value of the differential pressure rises its output signal changes from LOW to HIGH as soon as the differential pressure increases beyond an upper threshold value $p_{Uon}$, and as the differential pressure then drops its output signal changes from HIGH to LOW as soon as the differential pressure again falls below the lower threshold value $p_{Uoff}$. Thus there is a hysteresis of magnitude $p_{Uon} - p_{Uoff}$.

The threshold switch 30 switches as follows:

Below a temperature difference $T_{Uoff}$ its output has a LOW signal. As the value of the temperature difference increases its output signal changes from LOW to HIGH as soon as the temperature difference increases beyond the upper threshold value $T_{Uon}$, and as the value of the temperature difference then drops its output signal changes from HIGH to LOW as soon as the temperature difference drops again below the lower threshold value $T_{Uoff}$. Thus a hysteresis of magnitude $T_{Uon} - T_{Uoff}$ exists.

The converter 36 converts the continuous control signal appearing at the first input 42 of the converter 36 due to a connection between input E of said computer 14 and said first input 42 into a pulse-pause signal (HIGH-LOW), with a time dependence, i.e. the beginning of a pulse being determined by the signal of the clock generator 37 appearing at the second input 43 of the converter 36. The synchronized pulse-pause signal is then available at the output 44 of the converter 36. This synchronization has the advantage that constant switching of short duration can be prevented.

This output 44 and the output of the clock generator 37 are connected to the two inputs of the AND-gate 38, the output 44 is furthermore connected to a first input of the AND-gate 39. The other inputs of the AND-gate 39 are connected to the output of the flipflop 34 or to the output of the flipflop 35.

The input of the time-delay device 40 is connected to the output of the AND-gate 38 and the output of the time-delay device 40 leads to the input of the OR gate 41 and to the two set inputs S of the flipflops 34 and 35. Finally, the output of the AND-gate 39 is connected to the second input of the OR-gate 41 and the output of the OR-gate 41 is connected to the output 19 of the computer 14.

Hereinafter the functioning of this device shall be described. It shall be assumed that the choke element 4 is in the position shown in FIG. 1 in which the opening 5 takes effect. This position is designated position I. The output signal of the differential pressure sensor 8 goes to the data input D of the analog switch 24. At its control input St appears a signal which signals whether the choke element 4 is in position O or in position I. This signal is HIGH in position I. It shall also be described further on how this signal and its change is produced. If the signal at the input St is HIGH the analog switch 24 is switched on and the data signal appears at the output of the analog switch 24. If however the signal at the input St is LOW, the analog switch is switched off and the data signal does not appear at the output of the analog switch 24. Instead, the output of the analog switch 24 has a signal corresponding to the value zero. The output signal of the analog switch 24 arrives at the input of the multiplier 25. A factor characterizing the flow is stored in the multiplier 25 for the position I of the choke element 4. The multiplier 25 now multiplies this factor with the signal of the differential pressure sensor 8 and thus calculates a flow rate. This flow rate appears at the output of the multiplier 25 and is displayed by the display 21 when the switch 29 is in the corresponding position. The flow rate is furthermore transmitted to the integrator 27. A signal appears at the output of the integrator 27 which corresponds to the cumulated flow. This value can also be displayed if the changeover switch 29 is in the corresponding position.

The output signal of the temperature difference measuring element 11 reaches the first input of the multiplier 26 at the second input of which the flow rate appears. The multiplier 26 multiplies these two magnitudes, thus calculating the heat flow which appears at the output of the multiplier 26 and can be displayed when the switch 29 is in the corresponding position. The output signal of the multiplier 26 is furthermore transmitted to the integrator 28 in which the heat flow is cumulated into a quantity of heat. This quantity of heat can also be displayed if the switch 29 is in the proper position. That position is shown in FIG. 1.

The switch 29 can be controlled by pulses. It is thereby possible to display the following measured values in a cyclic sequence: flow rate, e.g. in liters per hour, cumulated flow quantity, e.g. in cubic meters, heat flow, e.g. in kilo-joule/per hour and heat quantity, e.g. in kilowatt-hours.

The following is a description of the manner in which the quantity of heat and/or the flow can be controlled. To control the quantity of heat or the flow a continuous signal which is proportional to the quantity of heat or to the flow is transmitted to the input E of the computer 14 and thereby to the input 42 of the converter 36. This signal, e.g. a voltage from 0 to 10 volts, can originate at a master heat regulator. The converter 36 converts this continuous signal into a pulse-pause signal. The greater the quantity of heat or the flow is to be, the greater is the continuous signal and the longer are the individual pulses emitted by the converter 36 and the shorter are the pauses between pulses. A pulse means that a HIGH signal appears at the output 44 while a pause means that a LOW signal appears at that output. The pulse-pause sequence, predicated on the continuous input signal, is synchronized by the clock generator 37. An output pulse always starts only when an impulse arrives from the clock generator 37.

It shall now be assumed that a signal 0.8, representing 8 Volts for instance, appears at the input E, i.e. the opening time of the choke element 4 is to be 80%. As a short pulse arrives from the clock generator 37 a HIGH signal now appears at the output 44. Both inputs to the AND-gate 38 are HIGH and thereby its output too. The impulse arriving at the time-delay device 40 is extended. The HIGH pulse arrives via gate 41 to the output 19, causing the drive 3 to bring the choke element 4 into its open position. However, the LOW-HIGH change also sets the two flipflops 34 and 35 simultaneously, causing their outputs to change over to the HIGH level. This HIGH signal remains until the flipflops 34 and 35 are reset, as shall be described further on. The HIGH signal at the flipflops 34 and 35 causes the AND-gate 39 to be prepared to allow the HIGH level of input 44 to pass. The output of the AND-gate 39 thus has a HIGH level. Thus the drive 3 remains excited even after disappearance of the pulse from the clock generator 37 and after the end of the delay caused by the time-delay device 40 and keeps the choke element 4 open. This state is maintained for as long as the output 44 has a HIGH level, unless one of the flipflops 34 or 35 is first reset.

If the end of a pulse has been reached at the output 44, the output of the AND element 39 changes over to a LOW level. If no pulse arrives from the clock generator 37 (it emits a pulse only about every 15 minutes), the output of the OR-gate 41 also changes to LOW because both inputs now have a LOW level. The drive 3 is no longer excited thereafter and the choke element returns into position O (closed).

The AND-gate 38 furthermore makes it impossible for the clock generator 37 alone to open the choke element 4. Only when the input signal at the input E is other than zero, so that a pulse appears also at the output 44, can the choke element open.

The choke element 4 can be controlled in the above-described manner by the signal at the input E. If the input signal is 0 the choke element 4 remains constantly closed; if the input signal is 1, the choke element remains constantly open, unless one of the flipflops 34, 35 is reset, as shall be described further on. With values other than 0 and 1, the choke element 4 is opened for a period that varies in length with the magnitude of the signal. Thus the quantity of heat can be controlled at will. At the same time the parameters for flowthrough and quantity of heat are calculated by the computer as described earlier.

A special case occurs when the pressure difference at the differential pressure sensor 8 drops below the value $p_{Uoff}$. The differential pressure $p_{Uoff}$ thus characterizes the lower limit of sufficient measuring precision. If the differential pressure falls below that value, the output of the threshold switch 31 changes from HIGH to LOW. For that reason the signal at the output of the invertor 33 changes from LOW to HIGH and the LOW-HIGH transition causes the flipflop 35 to be reset. Its output now changes over to LOW. Thereby the signal at the output of the AND-gate 39 also changes to LOW as does the signal at the output of the OR-gate 41, for as long as no subsequent clocking impulse arrives from the clock generator 37. The drive 3 is now triggered by a LOW signal so that it moves the choke element 4 into position O (closed).

Following this change-over from position I into the current position a differential pressure of uncertain magnitude exists at the choke element 4 which is now closed, and this is measured by the differential pressure sensor 8. Nevertheless the choke element 4 is not opened again, even if this differential pressure is greater than the upper threshold value $p_{Uon}$ of the threshold switch 31 because the flipflop 35 prevents it. A HIGH signal now appears at the output of the threshold switch 31, and a LOW signal at the output of the invertor 33 and thereby at the reset input R of the flipflop 35. The output signal of the flipflop 35 is thus not influenced by this signal change.

This only changes again with the arrival of the next clocking pulse from the clock generator 37. Because of the AND-gate 38 a clock impulse of the clock generator 37 is switched through to the set inputs S of the flipflops 34 and 35 only if the converter 36 has a HIGH signal at its output. This state can only occur when the input signal at its input 42 is other than zero. If this is the case the two flipflops 34 and 35 are reset. As a result a HIGH signal again appears at the output of the AND-gate 3 and therefore the drive 3 again opens the choke element 4. It can therefore be seen that when the pressure difference falls below the value $p_{Uoff}$ the choke element 4 remains closed until the next clock impulse is transmitted by the clock generator 37.

An analogous process is triggered when the temperature difference falls below the value $T_{Uoff}$. Similarly to what has been described above, this causes the flipflop 34 to be reset, causing in turn the choke element to close, and the flipflop 34 then prevents the choke element 4 from opening before the arrival of the following clock impulse from the clock generator 37.

These measures make it possible to ensure that the choke element 4 remains closed when the differential pressure and/or the temperature difference become so small that they can no longer be measured with sufficient precision. This makes it possible to improve the reliability of measurement of flow and heat quantity as the measuring errors become smaller overall.

The choke element 4 of FIG. 1 can assume only two positions: closed (position O) and open (position I). It is advantageous for the choke element to be made so that it can assume several different open positions with different effective cross-sections. With flow measuring and control systems according to the principle of measuring effective pressure, the problem is basically that the measured pressure difference represents a square function of the magnitude of the flow speed. The problem lies in the possible precision of the measure. If the measure of the differential pressure is sufficiently precise within a range between 10 and 100% of the nominal flow of the measuring device, i.e. with a ratio 1:10, the corresponding flow speeds are at a ratio of $1:\sqrt{10}$. From this it follows that ordinary measuring devices for flow speeds have only a small measuring range of sufficient measuring precision. As a result the measuring range is correspondingly smaller, even in measuring heat quantities.

Figure 2:
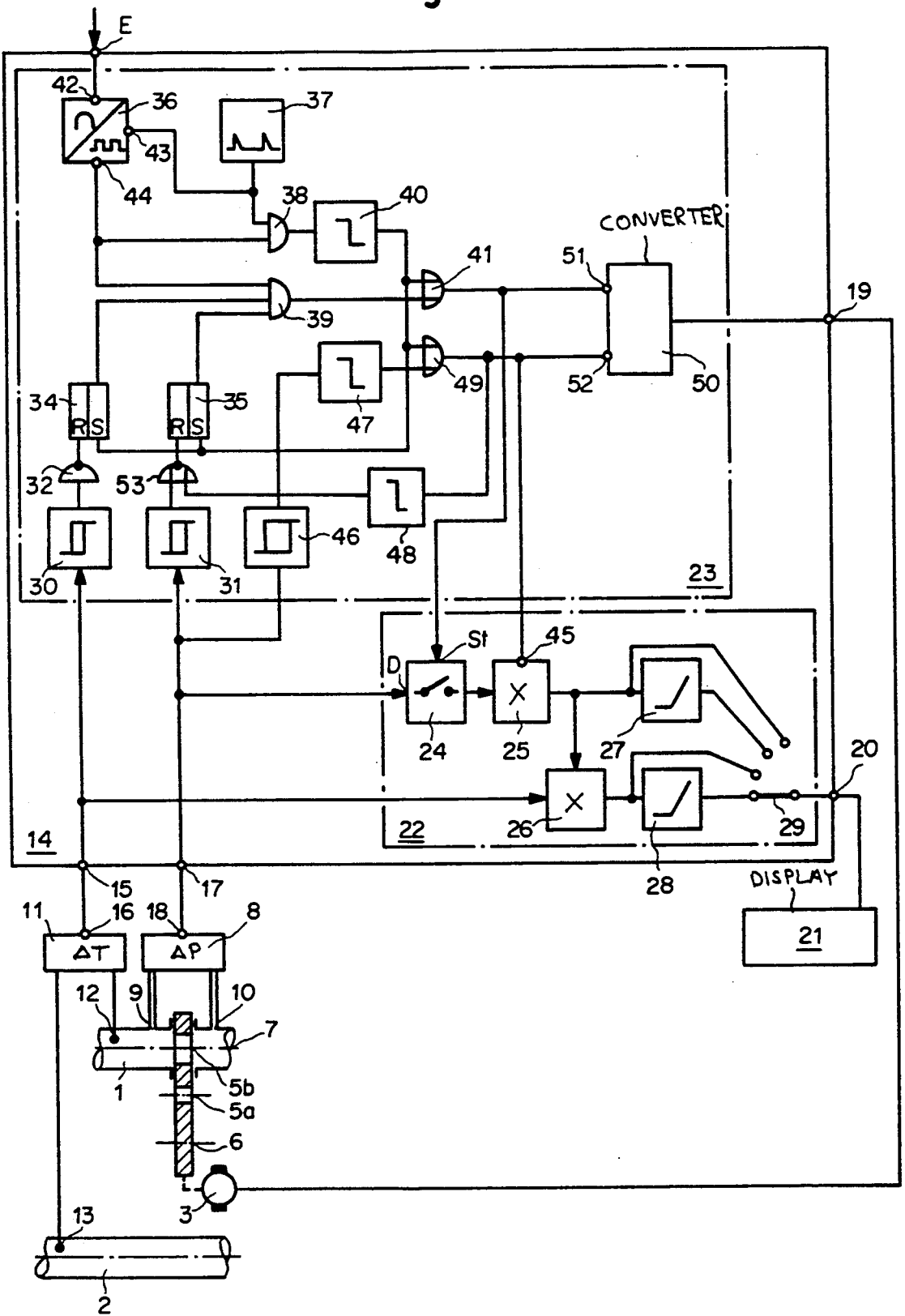
FIG. 2 shows a block diagram of a device with a three-phase choke element in accordance with an illustrative embodiment of the present invention.

By providing several effective opening cross-sections of different sizes for different flow speeds the measuring range can be extended. FIG. 2 shows a choke element with two openings 5a and 5b of different size. In addition to the position O already mentioned in the embodiment of FIG. 1 (choke element closed: axis 6 aligned with the middle axis 7 of the conduit 1), this choke element can assume two different open positions, i.e. a first position I in which the smaller cross-section 5a is effective, and a second position II in which the larger cross-section 5b is effective.

In order to be able to control such a three-step choke element, somewhat more is required of the computer 14. The computer 14 according to FIG. 2 is different in its functional block 22 in only one way from that of FIG. 1: the multiplier 25 has an additional input 45 the role of which shall be explained further below.

Other differences between FIGS. 1 and 2 concern the functional block 23. Here an additional threshold switch 46, additional time-delay devices 47 and 48, an additional OR-gate 49 and an additional converter 50 with inputs 51 and 52 are provided. Instead of the invertor 33, a NOR-gate 53 is provided. Both time-delay devices 47 and 48 prolong a HIGH impulse.

The threshold switch 46 switches as follows:

Below a differential pressure $p_{off}$ its output has a LOW signal. As the differential pressure increases, its output signal changes from LOW to HIGH as soon as the differential pressure increases beyond the upper threshold value $p_{on}$ and its output signal changes from HIGH to LOW as soon as the differential pressure drops back to below the lower threshold Value $p_{off}$. Thus a hysteresis of the magnitude $p_{on} - p_{off}$ exists. The threshold values $p_{off}$ and $p_{on}$ are here greater than the threshold value $p_{Uon}$.

The functioning of the converter 50 shall be described here before discussing the overall functions. This converter 50 has two inputs 51 and 52 at which either LOW or HIGH signals can appear, depending on the switched condition of the upstream elements. These are then two two-value signals. These are now converted in the converter 50 into a three-value signal. If a LOW signal appears at the input 51 connected to the OR-gate 41, the output of the converter 50 also is a LOW signal, and this independently of the state of the other input. If a HIGH signal appears at the input 51 connected to the OR-gate 41 and a LOW signal appears at the input 52 connected to the OR-gate 49, the output of the converter 50 is a signal ONE. If a HIGH signal appears at both inputs of the converter 50, the output of the converter 50 carries a signal TWO.

The output of the converter 50 can therefore assume three states: The signals LOW, ONE and TWO. The output of the converter 50 acts upon the drive 3 which can also assume three positions: Position 0 (closed), position I (smaller opening) and position II (larger opening). The system functions in that the converter 50 guides drive 3 into position O when its output is LOW, in that it guides it into position I when its output is the signal ONE and in that it guides it into position II when its output is the signal TWO.

Concerning the connections of the individual switching elements, FIG. 2 differs from FIG. 1 in the following: The third threshold switch 46 is connected to the input 17 as is the threshold switch 31. Its output is connected to the input of the time-delay device 47.

The output of the threshold switch 31 is connected to one of the inputs of the NOR-gate 53, the second input of which is connected to the output of the time-delay device 48 and the output of which is connected to the reset-input R of the flipflop 35. Furthermore a connection exists between the output of the OR-gate 49 and the input of the time-delay device 48.

One input of the OR-gate 49 is connected to the output of the time-delay device 47, and the other one to the output of the time-delay device 40. The output of the OR-gate 41 does not go directly to the output 19 here but is connected to the input 51 of the converter 50. The output of the OR-gate 49 is connected to the second input 52 of the converter 50 and is also connected to the input 45 of the multiplier 25. Finally, a connection is provided between the output of the converter 50 and the output 19 of the computer 14.

The functioning of this device shall be described hereinafter to the extent that it differs from that of the device in FIG. 1: It shall be assumed that the choke element 4 is in position I in which the opening 5a takes effect. For this position it is necessary that the two flipflops 34 and 35 be set and that a HIGH signal appear at the output 44 of the converter 36. The output of the OR-gate 41 then carries a HIGH signal, and so does the input 51 of the converter 50. Furthermore, the output of the threshold switch 46 must carry a LOW signal so that the output of the OR-gate 49 and thereby the input 52 of the converter 50 may carry a LOW signal. The output of the converter 50 is then in state ONE.

Since the input 52 of the converter 50 and the input 45 of the multiplier 25 are connected to each other, the same signal which also appears at the input 52 appears at the input 45. From what has been described above it can be seen that the signal at input 45 is LOW when the choke element 4 is in position I (opening 5a in effect) and is HIGH when it is in position II (opening 5b applies). The multiplier 25 has stored a factor characterizing the applicable position for each of these states, i.e. for each of these positions: a first factor for position I and a second factor for position II. The multiplier 25 multiplies this factor with the differential pressure signal which it is supplied by the analog switch 24. This means that the multiplication is done with the first factor if the input 45 is in the LOW condition and with the second factor if the input 45 is in the HIGH condition.

It shall now be assumed that the differential pressure increases beyond a value $p_{on}$. This causes the output of the threshold switch 46 to change from LOW to HIGH. The HIGH signal also appears at the output of the OR-gate 49 and thus at the input 52 of the transformer 50. This causes the drive 3 to be moved in such manner that the choke element 4 goes into position II with which the opening 5b takes effect. At the same time the HIGH signal also appears at the input 45 of the multiplier 25 so that only the factor for position II is taken into account in the multiplication.

If the differential pressure then falls below the value $p_{off}$, the output of the threshold switch 46 again changes from HIGH to LOW. This again triggers the drive 3 so that it brings the choke element 4 into position I. At the same time the signal at the input 45 of the multiplier 25 again changes to LOW so that the factor for position I is now taken into account in the multiplication. Following the delay period caused by the time-delay device 48 its output drops to LOW so that the output signal of the flipflop 35 is thus determined by the output of the threshold switch 31.

If the differential pressure drops further, i.e. to below the value $p_{Uoff}$, the output of the threshold switch 31 changes from HIGH to LOW. This causes the output signal of the NOR-gate 53 to change from LOW to HIGH while at the same time the input of the NOR-gate 53 which is connected to the output of the time-delay device 48 is LOW, as described earlier. The HIGH signal resets the flipflop 35. The AND-gate 39 is also locked thereby, the output of the OR-gate 41 changes over to LOW and thereby the drive 3 is brought into position O. This position is maintained until the next clock pulse is transmitted by the clock generator 37.

The range of precise flow measuring is advantageously extended by the two positions I and II with the effective cross-sections of different sizes. It is also possible to put more than two cross-sections of different size into effect. Additional threshold value switches with different limits, a multiplier with more than two factors and a combination converter 50/drive 3 with more than two open positions are then required.

It should also be noted that the two inputs 51, 52 of the transformer 50 receive HIGH signals from the OR-gates 41 and 49 as a result of a clock pulse of the clock generator 37 while a signal other than zero appears at the same time at the input E, whatever the last position of the choke element 4 may have been, so that said choke element 4 is necessarily moved into position II. Following the disappearance of the clock impulse, the choke element will assume whatever position applies as a result of the effective differential pressure and the effective temperature difference, depending on the states of the three threshold value switches 30, 31, 46.

It should furthermore be noted that it is also possible to use the described device solely as a device to measure flow and/or heat quantities, i.e. without the control feature. This is achieved by letting the signal 1 appear constantly at the input E.

Figure 3:
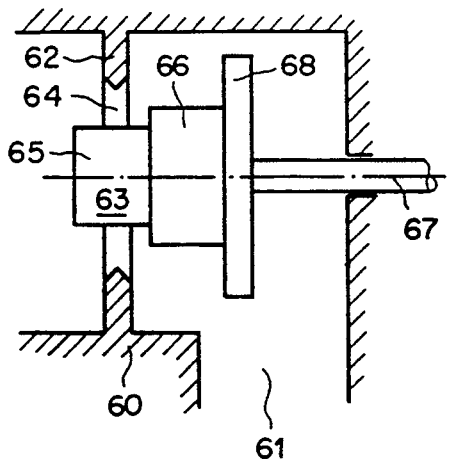
FIG. 3 shows a switchable choke element with three phases.

FIG. 3 shows an advantageous embodiment of a switchable choke element with three positions. A housing 60 encloses a flow channel 61 for the flow medium. Within the flow channel 61 a circular pin diaphragm 62 is installed at a right angle to the direction of flow. A displacement body 63 plunges into the opening of the circular pin diaphragm 62 so that an annular gap 64 which represents the effective cross-section of the choke element remains open. The displacement body 63 comprises individual cylinders 65, 66 with discretely stepped outer diameters. The displacement body 63 is mounted in the housing 60 by means of a shaft 67 so as to be capable of displacement along its axis, whereby the position of said displacement body 63 can be changed by means of the drive 3 (FIGS. 1 and 2). The displacement body 63 furthermore comprises a plate 68 the outer diameter of which is greater than the opening of the circular pin diaphragm 62 so that the circular pin diaphragm 62 can be closed by that plate 68. This position corresponds to position O. If the cylinder 66 is within the circular pin diaphragm 62 without application of the plate 68 against the circular pin diaphragm 62 this corresponds to position I. If the cylinder 65 is within the circular pin diaphragm 62 as shown in FIG. 3, this corresponds to position II. An analogy exists to the openings 5a and 5b of different size in the second embodiment (FIG. 2) or to the position without opening (FIG. 1).

It is also possible to provide three or more cylinders instead of the shown two cylinders 65, 66 of different size in order to thus obtain several annular gaps 64 of different size. The choke element can then be switched in a plurality of steps.

This embodiment has the advantage that no special sealing problems are necessary with it since only the shaft 67 has to extend through the housing and must be sealed off. Furthermore the precision of positioning the displacement body 63 is not critical. Small differences in the position of the displacement body 63 do not influence the size of the annular gap 64. For that reason the drive 3 can also be made very simply. Furthermore the variations in stroke due to thermal effects do not change the size of the annular gap.

It is advantageous to give the circular pin diaphragm 62 sharp edges at its inner border. Thus furthers increases the insensitivity against imprecision of the position of the displacement body 63.

Figure 4:
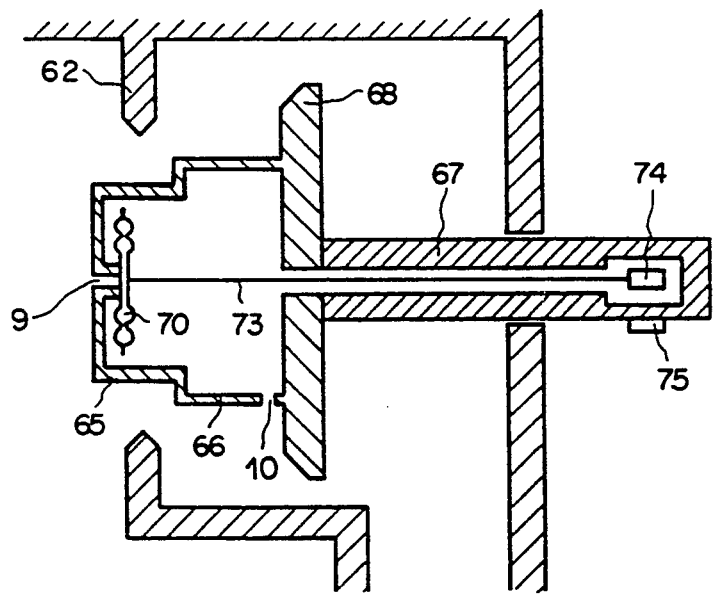
FIG. 4 shows a switchable choke element with a measuring device to measure the pressure difference.

It is advantageous to install the means for the measuring of the pressure difference within the displacement body 63. FIG. 4 shows the construction of such a displacement body 63. A pressure measuring element 70 connected interlockingly to the displacement body 63 and connected via the first opening 9 and the second opening 10 to the spaces located before and after the circular pin diaphragm 62 as seen in direction of flow is located inside said displacement body 63 so that the differential pressure acts directly upon the pressure measuring element 70. The deformation of the pressure element 70 is transmitted via a rod 73 directly to a measuring system comprising a magnet 74 and a Hall probe 75. The pressure difference is thus deformed into a path which can be scanned as a voltage by the Hall probe 75. This voltage value can be transmitted to the computer 14, as indicated in the examples of embodiments according to FIGS. 1 and 2.

Figure 5:
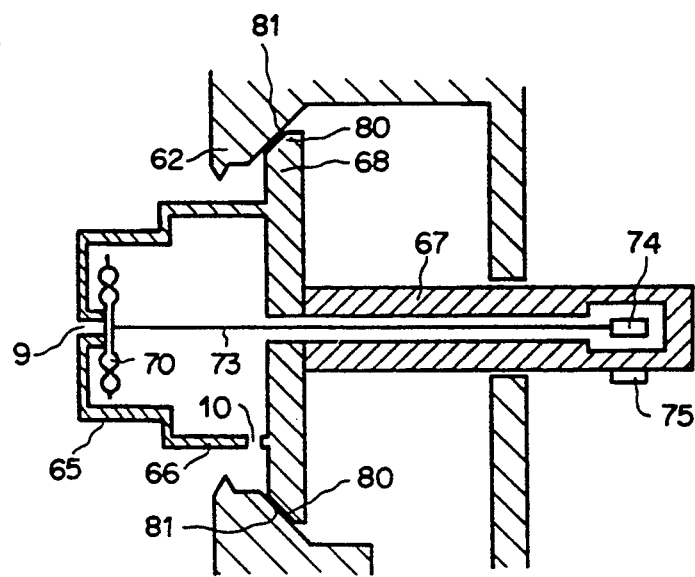
FIG. 5 shows a switchable choke element with means to measure the pressure difference in the closed position.

It is furthermore advantageous for the openings 9 and 10 to be arranged so that they are located on one side of the choke element closed by the plate 68, as seen in direction of flow and as shown in FIG. 5. Plate 68 has a sealing surface 80 which presses in closed position (position O) against a seat 81 in the housing. This ensures that the differential pressure at the pressure measuring element 70 is always zero when the valve is closed. This offers the possibility of setting the output signal of the measuring system comprising the magnet 73 and the Hall probe 74 to zero. This adjustment can be made advantageously within the computer 14, always when the choke element reaches position O. It is thus possible to carry out a correction of the measured value of the pressure difference with a closed choke element 4.

In the embodiments mentioned above, the choke element 4 together with its appertaining elements is built into the initial conduit 1 of a heat circuit. However it is also possible to build the choke element 4 into the return conduit 2.

We claim:

1. A device for measuring or controlling a transport property of a flow medium comprising,
   a conduit which carries a flow medium,
   a choke element in said conduit having a first distinct open operating position and a second distinct closed operating position,
   a drive for driving said choke element form one of said distinct operating positions to the other,
   means for measuring the difference in pressure before and after said choke element in said conduit, and
   processing means responsive to said pressure difference measuring means for calculating a transport property of said flow medium in said conduit, said processing means including means for receiving a continuous externally generated control signal which indicates a desired value of said transport property, and converting means for converting the continuous control signal into a pulse-pause signal for controlling the amount of time said choke is in said first and second distinct operating positions.

2. Device as in claim 1 wherein the processing means comprises a converter capable of being synchronized by a clock generator for converting the continuous control signal into the pulse-pause signal.

3. Device as in claim 1, wherein the processing means comprises a first threshold value switch for putting the choke element into the closed position when a difference of temperature between said flow medium before said choke and said flow medium after said choke drops below a minimum temperature difference.

4. Device as in claim 3 wherein the processing means comprises a second threshold value switch for putting the choke element into the closed position when the pressure difference drops below a minimum pressure difference.

5. A device for measuring or controlling a transport property of a flow medium comprising,
 a conduit which carries a flow medium,
 a choke element in said conduit having a first distinct open operating position and a second distinct closed operating position,
 a drive for driving said choke element from one of said distinct operating positions to the other,
 means for measuring the difference in pressure before and after said choke element in said conduit, and
 processing means responsive to said pressure difference measuring means for calculating a transport property of said flow medium in said conduit, said processing means including means for receiving a continuous control signal which indicates a desired value of said transport property, converting means for converting the continuous control signal into a pulse-pause signal for controlling the amount of time said choke is in said first and second distinct operating positions, a converter capable of being synchronized by a clock generator for converting the continuous control signal into the pulse-pause signal, a first threshold value switch for putting the choke element into the closed position when a difference of temperature between said flow medium before said choke and said flow medium after said choke drops below a minimum temperature difference, a second threshold value switch for putting the choke element into the closed position when the pressure difference drops below a minimum pressure difference, and means for holding the choke element in the closed position whatever the actual pressure difference may be.

6. A device for measuring or controlling a transport property of a flow medium comprising,
 a conduit which carries a flow medium,
 a choke element in said conduit having a first distinct open operating position and a second distinct closed operating position,
 a drive for driving said choke element from one of said distinct operating positions to the other,
 means for measuring the difference in pressure before and after said choke element in said conduit, and
 processing means responsive to said pressure difference measuring means for calculating a transport property of said flow medium in said conduit, said processing means including means for receiving a continuous control signal which indicates a desired value of said transport property, and converting means for converting the continuous control signal into a pulse-pause signal for controlling the amount of time said choke is in said first and second distinct operating positions, a converter capable of being synchronized by a clock generator for converting the continuous control signal into the pulse-pause signal, a first threshold value switch for putting the choke element into the closed position when a difference of temperature between said flow medium before said choke and said flow medium after said choke drops below a minimum temperature difference, and a second threshold value switch for putting the choke element into the closed position when the pressure difference drops below a minimum pressure difference,
 wherein the choke element, in addition to the closed position, has at least two different open positions with differently sized cross-sections, wherein the choke element can be controlled by at lest one additional threshold value switch, and wherein said processing means includes a multiplier for storing factors characteristic of the flow of said flow medium and for multiplying said pressure difference by said factors.

7. Device as in claim 6, wherein the choke element comprises a circular pin diaphragm and a displacement body having a plurality of sections with differently sized cross-sections.

8. Device as in claim 7, wherein the circular pin diaphragm has sharp edges.

9. Device as in claim 7, wherein the displacement body comprises a plurality of axially aligned cylindrical portions with different outer diameters.

10. Device as in claim 7 wherein the means for measuring the pressure difference is located within the displacement body.

11. Device as in claim 10, wherein the displacement body comprises a plate with a sealing surface which can be moved against a seat located in said conduit, and wherein first and second openings connect a differential pressure sensor to first and second spaces before and after the choke element located on the same side of the plate as seen in direction of flow.

12. Device as in claim 1 wherein said processing means includes means for correcting the measured value of the pressure difference when the choke element is in the closed position.

* * * * *